United States Patent Office 2,838,801
Patented June 17, 1958

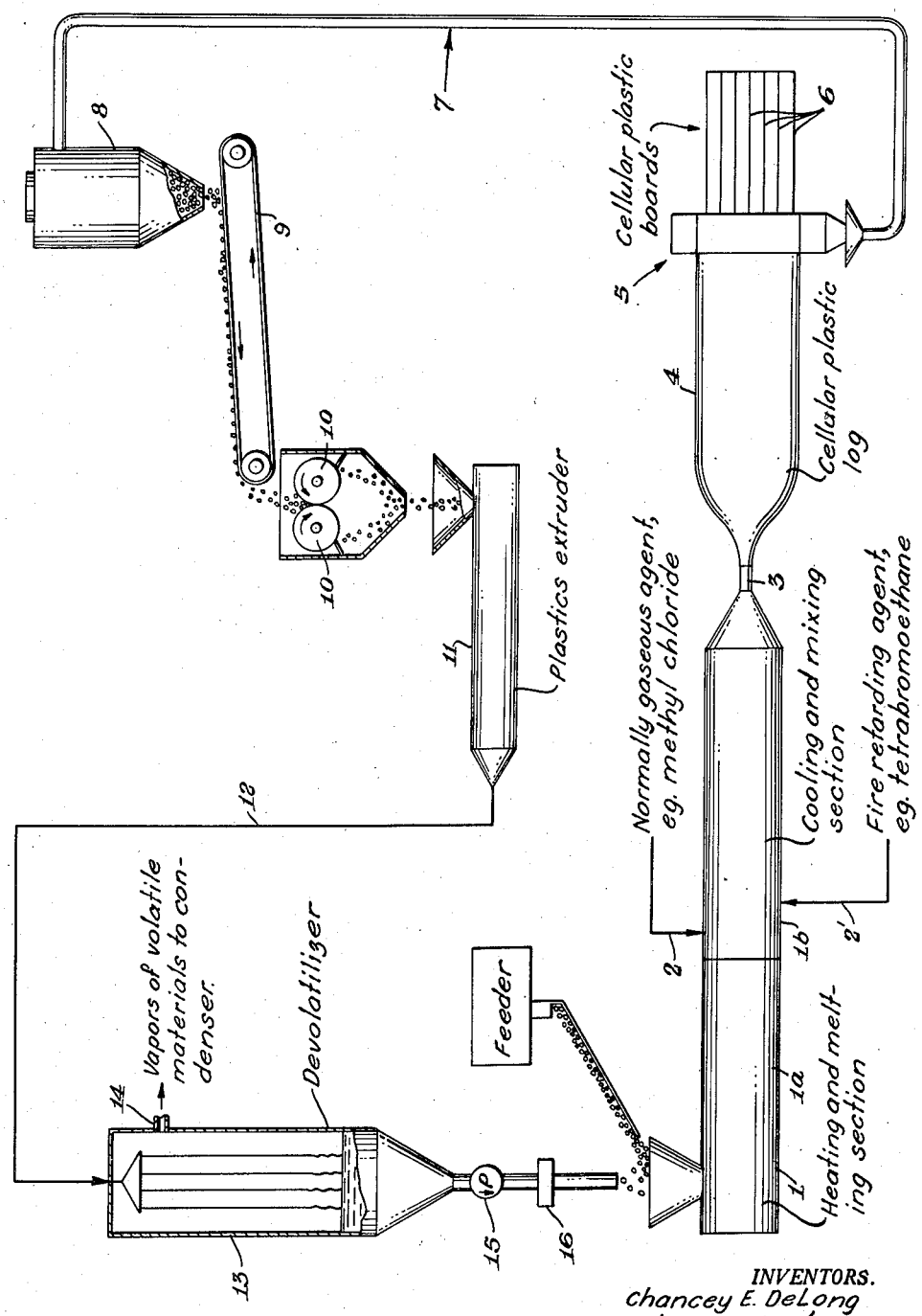

2,838,801

PROCESS FOR MAKING FIRE-RESISTANT CELLULAR VINYL AROMATIC POLYMER ARTICLES

Chancey E. De Long, Wilson W. Hunt, and Samuel G. Ludington, Midland, Mich., assignors to The Dow Chemical Company, Midland, Mich., a corporation of Delaware Application March 29, 1957, Serial No. 649,350

5 Claims. (Cl. 18—48)

This invention relates to the manufacture of cellular plastic bodies from thermoplastic vinyl aromatic polymers. It pertains especially to improvements in a process for making self-extinguishing cellular polystyrene.

In the manufacture of cellular plastic bodies from thermoplastic vinyl aromatic polymers wherein a vinyl aromatic polymer and a normally gaseous agent, e. g. methyl chloride, are mixed together under pressure at elevated temperatures to form a homogeneous mobile gel and the latter is extruded into a zone of lower pressure such that the extruded materials expands with resultant formation of a cellular plastic body, there is obtained an appreciable amount of waste or scrap foam in the form of sawdust, shavings or slabs when a log or billet of the foamed material is sawed to obtain boards, planks or panels having a desired size and shape. Since the scrap foam may represent a considerable proportion of the polymer initially used, the utilization of the scrap by recycling it to the process for the production of a further quantity of foam is to be desired.

In the manufacture of self-extiguishing foam from vinyl aromatic polymers a fire-retardant such as tetrabromoethane, alpha,beta-dibromoethylbenzene, ar-chloro-alpha,beta - dibromoethylbenzene, 1,2 - dibromopropane, 1,2-dibromobutane, 1,2,3-tribromopropane, tetrabromopentane, etc., is incorporated with the mobile gel, usually in amounts corresponding to from 1 to 10 percent by weight of the polymer, and the resulting gel expanded to form a cellular plastic body having said agent(s) dispersed throughout.

Our researches have shown that using the scrap non-flammable foam, alone, or in admixture with fresh polymer, for the production of a further quantity of foam has certain disadvantages. It has been found that the fire-retarding agent or agents in the scrap foam has no measurable flame-retarding effect when such scrap is reused to produce foam. In reusing the scrap foam to produce a further quantity of self-extinguishing foam the amount of the fire-retardant therein must be disregarded and a quantity of a fire-retarding agent added as if none were present in the starting polymer in order to obtain a cellular body having a desired non-flammability. The adding of a fire-retarding agent in amounts sufficient to accomplish the desired result in addition to the fire-retarding agent in the scrap polymer foam has the disadvantage of lowering the heat distortion temperature of the polymer and renders the cellular product less suitable for its intended use than is desired. The presence of other volatile or low boiling ingredients such as monomers or low molecular weight polymers, e. g. dimers, trimers, etc., which are frequently present in the scrap foam, likewise tend to effect a lowering of the heat distortion temperature of the cellular product prepared from scrap foam or mixtures of scrap foam polymer and virgin polymer, and is disadvantageous.

It is a principal object of the invention to provide a method for removing volatile ingredients from scrap foam, prepared from thermoplastic vinyl aromatic polymers, so as to render the scrap polymer suitable for reuse in a process for making a further quantity of cellular foam. Another object is to provide a method of removing volatile fire-retarding agents from scrap flame-resistant foamed vinyl aromatic polymers. A further object is to provide improvements in a continuous process for making self-extinguishing polystyrene foam which improvements permit reuse of the scrap foam in the process for the production of a further quantity of foam. Other and related objects may appear from the following description of the invention.

According to the invention the foregoing and related objects are obtained by heating the scrap foam containing volatile ingredients to the melting temperature of the polymer or above under subatmospheric pressures sufficient to vaporize the volatile ingredients under the conditions employed and separating the vaporized ingredients from the polymer.

The invention is advantageously employed in a process for making self-extinguishing cellular articles from vinyl aromatic polymers in continuous manner wherein a heat-plastified vinyl aromatic polymer, a fire-retarding agent and a normally gaseous agent are intimately blended with one another under pressure to form a mobile gel which is brought to a uniform temperature between 60° and 130° C. and is extruded into a zone of sufficiently lower pressure such that the extruded material expands with resultant formation of a cellular article. The cellular article, usually a log or billet, is trimmed, sawed or cut into boards or planks having a desired size, e. g. boards having the dimensions of 2 x 12 inches by 8 feet long, as it is formed. The scrap foam, i. e. trimmings and sawdust, obtained in the process is collected, ground, if required, to form particles suitably of a size less than one-half inch in their greatest dimension for convenience in handling, is pressed to sinter and densify the same, heated to its melting point or above, preferably at subatmospheric pressure, to vaporize and separate the volatile components from the polymer and the devolatilized polymer is recycled or returned to the process to produce a further quantity of foam.

The invention is described more particularly with reference to the accompanying drawing showing an arrangement of the principal major elements of an apparatus for carrying out the preparation of cellular plastic articles and recycling of the scrap foamed polymer to the process.

In the drawing, the numeral 1 indicates a plastics extruder comprising a heating and melting section 1a and a cooling and mixing section 1b having inlets 2 and 2' for feed of a normally gaseous agent and a fire retarding agent thereto and a discharge outlet 3 through which the gel is extruded into a zone of lower pressure, e. g. the atmosphere, wherein it expands to form a cellular plastic log or billet 4. The cellular log 4 of the polymer material is passed, preferably as it is formed and cooled to a temperature below the heat distortion temperature of the polymer, through a sawing or cutting device 5 which trims and saws the log to form cellular boards 6. The sawdust and trimmings are collected and fed via conduit 7 or other means, e. g. an endless belt, into vessel 8, then withdrawn from said vessel 8 onto endless belt 9 and conveyed to rolls 10, between which the foam particles of polymer are pressed, heated to the softening point or thereabout and densified. The densified polymer is scraped from rolls 10 and is fed to a plastics extruder 11 wherein it is heated to its melting temperature or above. The molten polymer is continuously discharged from the extruder 11 and passed via line 12 while hot to a suitable devolatilizer 13 wherein the volatile components, including the fire-retarding agent therein, are vaporized and removed from fine streams of the hot polymer falling through space under a reduced pressure of the order of 100 millimeters of mercury absolute pressure or less. The vapors of the volatile components are withdrawn from vessel 13 via outlet 14. The polymer is gathered in a pool at the bottom of the devolatilizer 13 while still hot and is withdrawn therefrom by a plastics pump 15. The withdrawn polymer is cooled below the solidus point, commonly as a thin strip and is cut into particles of a size suitable as feed for molding operations by a cutter 16 and is fed into the plastics extruder 1, together with fresh or virgin polymer. In an alternate procedure the heat-plastified and devolatilized recovered polymer can be fed by means of a plastics extruder directly into the cooling and mixing section 1b of the plastics extruder 1.

It is important in carrying out the devolatilization of the recovered foamed polymer that the polymer be heated to a temperature of at least 190° C., preferably between 220° and 250° C. and at subatmospheric pressures of 100 millimeters of mercury, absolute pressure, or lower, in order to readily, rapidly and efficiently remove the volatile components. The polymer should not be heated at temperatures substantially higher than 280° C. in order to avoid deterioration or breakdown of the polymer molecules.

The method can be employed for the recovery and utilization of the scrap foam prepared from vinyl aromatic polymers such as polystyrene, polyvinyltoluene, copolymers of styrene with from 2 to 10 percent of natural or a synthetic rubber, copolymers of styrene and from 5 to 30 percent of alpha-methyl styrene, copolymers of styrene and from 5 to 30 percent of acrylonitrile, copolymers of styrene and from 5 to 30 percent of methylmethacrylate or copolymers of any two or more monovinyl aromatic hydrocarbons such as styrene, vinyltoluene, vinylxylene, isopropylstyrene, etc.

The following example illustrates a way in which the principle of the invention has been applied, but is not to be construed as limiting its scope.

EXAMPLE

Waste self-extinguishing polystyrene foam containing 5 percent by weight of sym-tetrabromoethane as fire-retardant was sintered by pressing and heating the same between rolls at a temperature of 120° C. to obtain dense granules. The granular material was fed to a plastics extruder wherein it was heat-plastified and extruded at a temperature of 250° C. as a plurality of fine strands in a devolatilization kettle under an absolute pressure of 10 millimeters of mercury to vaporize and separate volatile ingredients from the streams of polystyrene falling therethrough. Vapors of the volatile ingredients were withdrawn from the devolatilization kettle by means of a vacuum pump and condensed. The devolatilized polystyrene was collected as a pool in the bottom of the kettle from which it was withdrawn and extruded by means of a plastics pump and was promptly cooled and cut into small pieces. The recovered polystyrene has a viscosity characteristic of 19 centipoises as determined for a 10 weight percent solution of the polystyrene in toluene at 25° C. and contained 1.86 percent of volatiles.

A mixture of 30 percent by weight of the recovered polystyrene and 70 percent of virgin polystyrene having a viscosity characteristic of 22 centipoises and containing 1.5 percent by weight of volatiles was fed to a plastics extruder wherein it was pressed and heated to its melting temperature. The molten polystyrene was forwarded into a mixing and cooling zone wherein it was blended with 10 percent by weight of methyl chloride as foaming agent and 5 percent of tetrabromoethane as fire retardant under pressure and cooled to a temperature of 100° C. then extruded as a uniform mobile gel into the atmosphere wherein it expanded to form a cellular product. After allowing the cellular product to stand at room temperature for 24 hours, one inch square test cubes were cut from the cellular product. These test cubes were used to determine a heat distortion temperature for the foamed product.

Other test pieces of the polystyrene foam were used to determine its self-extinguishing property employing procedure similar to that described in A. S. T. M. D757–49.

For purpose of comparison polystyrene foam was prepared in similar manner from a mixture of 30 percent by weight of the non-devolatilized waste self-extinguishing foam containing 5 percent by weight of tetrabromoethane and 70 percent of the virgin polystyrene, using methyl chloride as the foaming agent and adding tetrabromoethane as the fire-retardant in total amount corresponding to 5 percent by weight of the total polystyrene. The following results were obtained:

| Ingredients and Properties | A | B |
|---|---|---|
| Virgin Polystyrene_____percent | 70 | 70 |
| Devolatilized Reclaim Polystyrene_____do____ | 0 | 30 |
| Non-devolatilized Reclaim Polystyrene___do____ | 30 | 0 |
| Tetrabromoethane_____do____ | 5 | 5 |
| Heat Distortion Temp. (1 da.)_____° F__ | 150 | 160 |
| Heat Distortion Temp. (8 da.)_____° F__ | 160 | 175 |
| Self-extinguishing Time_____seconds_ | 15 | 1 |

We claim:

1. In a continuous process for making a cellular thermoplastic article wherein a heat-plastified thermoplastic vinyl aromatic polymer at temperatures between 120° and 250° C. and a normally gaseous agent capable of being dissolved by the polymer are fed into admixture with one another under pressure in a mixing and cooling zone in amounts corresponding to from 5 to 25 parts by weight of the normally gaseous agent per 100 parts of the polymer and wherein the ingredients are blended into a uniform mobile gel under pressure and cooled to a temperature between 60° and 130° C. in said mixing and cooling zone, and the gel is continuously extruded into a zone of lower pressure sufficient to expand the extruded material with resultant formation of a cellular plastic body which is cut and trimmed to shaped articles, thereby producing an appreciable proportion of scrap foam, the steps which consist in collecting the scrap foam, pressing and heating said foam at temperatures between 90° and 160° C. to obtain a dense sintered material, heating the sintered material to melting temperatures between 190° and 280° C. and vaporizing and separating volatile ingredients therefrom in a devolatilizing zone under not more than 100 millimeters absolute pressure, separately withdrawing vapors of the volatilized materials and the heat-plastified and devolatilized vinyl aromatic polymer from said devolatilizing zone and returning the recovered and devolatilized polymer to the process and into admixture with a further quantity of a thermoplastic vinyl aromatic polymer and a normally gaseous agent in the proportions stated.

2. In a continuous process for making a solid nonflammable cellular resinous body composed for the most part of a multiplicity of individually closed cells having thin walls of a solid solution of a thermoplastic vinyl aromatic polymer containing from 1 to 10 percent by weight of an organic flame-proofing compound, wherein a heat-plastified thermoplastic vinyl aromatic polymer at temperatures between 120° and 250° C. and a normally gaseous agent capable of being dissolved by the polymer are fed into admixture with one another under pressure in a mixing and cooling zone in amounts corresponding to from 5 to 25 parts by weight of the normally gaseous agent per 100 parts of the polymer, and into admixture with from 1 to 10 percent, based on the weight of the polymer, of an organic flame-proofing compound, and wherein the ingredients are blended into a uniform mobile gel under pressure and cooled to a temperature between 60° and 130° C. in said mixing and cooling zone below the boiling point of the normally gaseous agent under the conditions employed and the gel is continuously extruded from the mixing and cooling zone into a zone of lower pressure sufficient to cause expansion of the extruded material with resultant formation of a cellular product which is cut and trimmed to shaped articles, thereby producing an appreciable proportion of scrap foam, the steps which consist in collecting the scrap foam, pressing and heating said foam at temperatures between 90° and 160° C. to obtain a dense sintered material, heating the sintered material to melting temperatures between 190° and 280° C. and vaporizing and separating volatile ingredients therefrom in a devolatilizing zone under not more than 100 millimeters absolute pressure, separately withdrawing vapors of the volatilized materials and the heat-plastified and devolatilized polymer from said devolatilizing zone and returning the recovered and devolatilized polymer to the process and into admixture with a further quantity of a heat-plastified thermoplastic vinyl aromatic polymer, a normally gaseous agent and an organic flame-proofing compound in the proportions stated.

3. A process as claimed in claim 2, wherein the thermoplastic vinyl aromatic polymer is polystyrene.

4. A process as claimed in claim 2, wherein the organic flame-proofing compound is tetrabromoethane.

5. A process as claimed in claim 2, wherein the vinyl aromatic polymer is polystyrene and the organic flame-proofing compound is tetrabromoethane.

References Cited in the file of this patent

UNITED STATES PATENTS

| | | |
|---|---|---|
| 2,576,911 | Amos | Dec. 4, 1951 |
| 2,577,743 | De Long | Dec. 11, 1951 |

FOREIGN PATENTS

| | | |
|---|---|---|
| 1,081,583 | France | June 9, 1954 |
| 745,248 | Great Britain | Feb. 22, 1956 |